United States Patent
Gesele et al.

(10) Patent No.: US 6,332,353 B1
(45) Date of Patent: *Dec. 25, 2001

(54) METHOD AND DEVICE FOR MEASURING THE ANGLE OF INCLINATION ON LATERALLY INCLINED BENDS

(75) Inventors: Frank Gesele, Ingolstadt; Holger Maier, Schwaikheim, both of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,371

(22) Filed: May 12, 1999

(30) Foreign Application Priority Data

May 15, 1998 (DE) .............................. 198 21 617

(51) Int. Cl.[7] ...................................................... G01C 9/10
(52) U.S. Cl. .............................. 73/118.1; 73/146; 33/335; 701/1
(58) Field of Search .................... 73/118.1, 146; 33/335, 336, 337; 701/1, 29

(56) References Cited

U.S. PATENT DOCUMENTS

| 4,741,207 | * | 5/1988 | Spangler ............................ 73/146 |
| 4,908,767 | * | 3/1990 | Scholl et al. ...................... 73/510 |
| 5,440,923 | * | 8/1995 | Arnberg et al. ................... 73/146 |
| 5,446,658 | * | 8/1995 | Pastor et al. ...................... 73/104 |
| 5,557,520 |   | 9/1996 | Suissa et al. . |
| 5,707,117 |   | 1/1998 | Hu et al. . |
| 5,710,704 | * | 1/1998 | Graber . |
| 5,711,023 | * | 1/1998 | Eckert et al. . |
| 5,797,109 |   | 8/1998 | Aminpour et al. . |
| 6,023,220 | * | 2/2000 | Dobler et al. . |
| 6,067,497 | * | 5/2000 | Sekine et al. . |
| 6,175,781 | * | 1/2001 | Gesele et al. . |

FOREIGN PATENT DOCUMENTS

| 4325413 C2 | 5/1995 | (DE) . |
| 4443522 A1 | 6/1996 | (DE) . |
| 196 36 443 A1 | 3/1998 | (DE) . |
| 197 08 508 A1 | 3/1998 | (DE) . |
| 0769701 A1 | 4/1997 | (EP) . |
| WO 97/28037 | 8/1997 | (EP) . |

OTHER PUBLICATIONS

European Search Report on Application No. 99108895.6–2213 dated Feb. 7, 2001.

* cited by examiner

*Primary Examiner*—Eric S. McCall
(74) *Attorney, Agent, or Firm*—Venable; Norman N. Kunitz

(57) ABSTRACT

The angle of inclination of a bend encountered by a vehicle is calculated from the rotation rate, lateral acceleration and speed of the vehicle, thereby avoiding the necessity of sensors not already existing in the vehicle.

8 Claims, 4 Drawing Sheets

METHOD AND DEVICE FOR MEASURING THE ANGLE OF INCLINATION ON LATERALLY INCLINED BENDS

BACKGROUND OF THE INVENTION

The invention relates to a method and a device for measuring the angle of inclination on laterally inclined bends.

In determining or assessing a driving situation within the scope of a vehicle dynamics stability controller, such as in ESP (Electronic Stability Program), errors arise in evaluating the vehicle state when traversing a laterally inclined bend which is distinguished by a side tilt with respect to the horizontal. One reason for this is the fact that parameters which characterize the respective vehicle state are additionally influenced by gravitation or centrifugal forces. A laterally inclined bend can be traversed in the extreme case without actuating the steering wheel. A vehicle dynamics stability controller perceives absence of the steering wheel displacement, but detects a rotation rate with reference to the Z-axis and a lateral acceleration with reference to the Y-axis. The result of this is that the vehicle dynamics stability controller is activated and initiates incorrect interventions in the vehicle dynamics. Instances of incorrect tripping of motor vehicle safety systems can also occur. For this reason, it is necessary in the extreme case, for example, for the ESP to be switched off by the driver when a laterally inclined bend is being traversed.

DE 43 25 413 C2 discloses a method for determining parameters which characterize the driving condition of a motor vehicle, such as rotation rate, lateral acceleration, steering angle, speed, acceleration, wheel speeds etc. The angle of inclination is required here as a state variable for exact calculation of the vehicle state.

However, it is disadvantageous in this case that no indication is given of how an angle of inclination is detected qualitatively or quantitatively.

Various methods are known for detecting the vehicle inclination and/or the roadway inclination with respect to the horizontal.

EP 0 769 701 A1 discloses a device for a vehicle which contains two acceleration sensors. These two acceleration sensors are arranged at a defined angle to the horizontal plane. Without vehicle inclination, the acceleration sensors indicate the same deviation from the vehicle lateral acceleration actually present. It is possible for the vehicle inclination, and from this the actual vehicle acceleration, to be calculated in accordance with the vehicle inclination by forming the difference and sum of the two sensor signals.

However, it is disadvantageous in this case that a plurality of acceleration sensors are required, and that these acceleration sensors serve only to detect a side tilt of the motor vehicle. This solution turns out to be very cost intensive. Again, it requires additional space. A further disadvantage consists in the two identical, but differently installed measuring systems do not reliably detect the correct angle of inclination of the roadway in every driving situation, and falsely indicate an angle of inclination in the case of swerving or roadway bumpiness.

Another method for determining the roadway inclination in the longitudinal direction is disclosed in DE 44 43 522 A1. Here, a freely rolling state, at least of one driven axle of the vehicle, is detected at least once. In this state, the wheels of the driven axles also roll without slipping. The differential speed of a non-driven axle is determined for the purpose of balancing the wheel speeds between the driven axles. The value of the braking ratio, that is to say the vehicle deceleration, is measured simultaneously. The values determined for the differential speed and the braking ratios are used to determine the value of an inclination constant. The roadway inclination can be determined with the aid of the inclination constant from the values determined for the differential speed and braking ratio.

It is disadvantageous in this case that only the inclination of the roadway in the longitudinal direction can be measured, and that a freely rolling state must be brought about for a measurement, in order to detect a roadway inclination at all.

SUMMARY OF THE INVENTION

It is therefore the object of the invention to specify a method which overcomes these disadvantages and increases the accuracy and the reliability of such systems.

This object is achieved according to the invention by simultaneously measuring the lateral acceleration, the rotation rate and the vehicle speed in a moving motor vehicle, and the angle of inclination is calculated in real time by means of a logic operation on these three measured factors.

The advantages achieved with the invention are the reliability of this measurement of inclination, the simplicity of implementation and the low costs, since, for example, in most vehicles a rotation rate sensor and a lateral acceleration sensor are installed in any case in addition to a speedometer. Such sensors are already required, inter alia, for airbag triggers and vehicle dynamics controllers. As a result, the angle of inclination of the roadway can be determined without additional outlay on material and costs, and be made available for further calculation to electronic motor vehicle devices, in particular vehicle dynamics stability controllers or motor vehicle safety systems.

In another aspect of the invention, the determined angle of inclination can be made available for correction calculations in vehicle dynamics stability controllers, with the result that such systems also operate reliably on bends with an inclined roadway. A counter also proves to be particularly advantageous in such a method. It is used to detect the relative duration of cornering on an inclined roadway. Short-term driving conditions which happen to resemble traversing a bend with an inclined roadway are thereby detected and can be distinguished from actual cornering on an inclined roadway.

BRIEF DESCRIPTION OF THE DRAWING

The invention will become apparent from a reading of a detailed description taken in conjunction with the drawing, in which.

DETAILED DESCRIPTION

Figure 1:
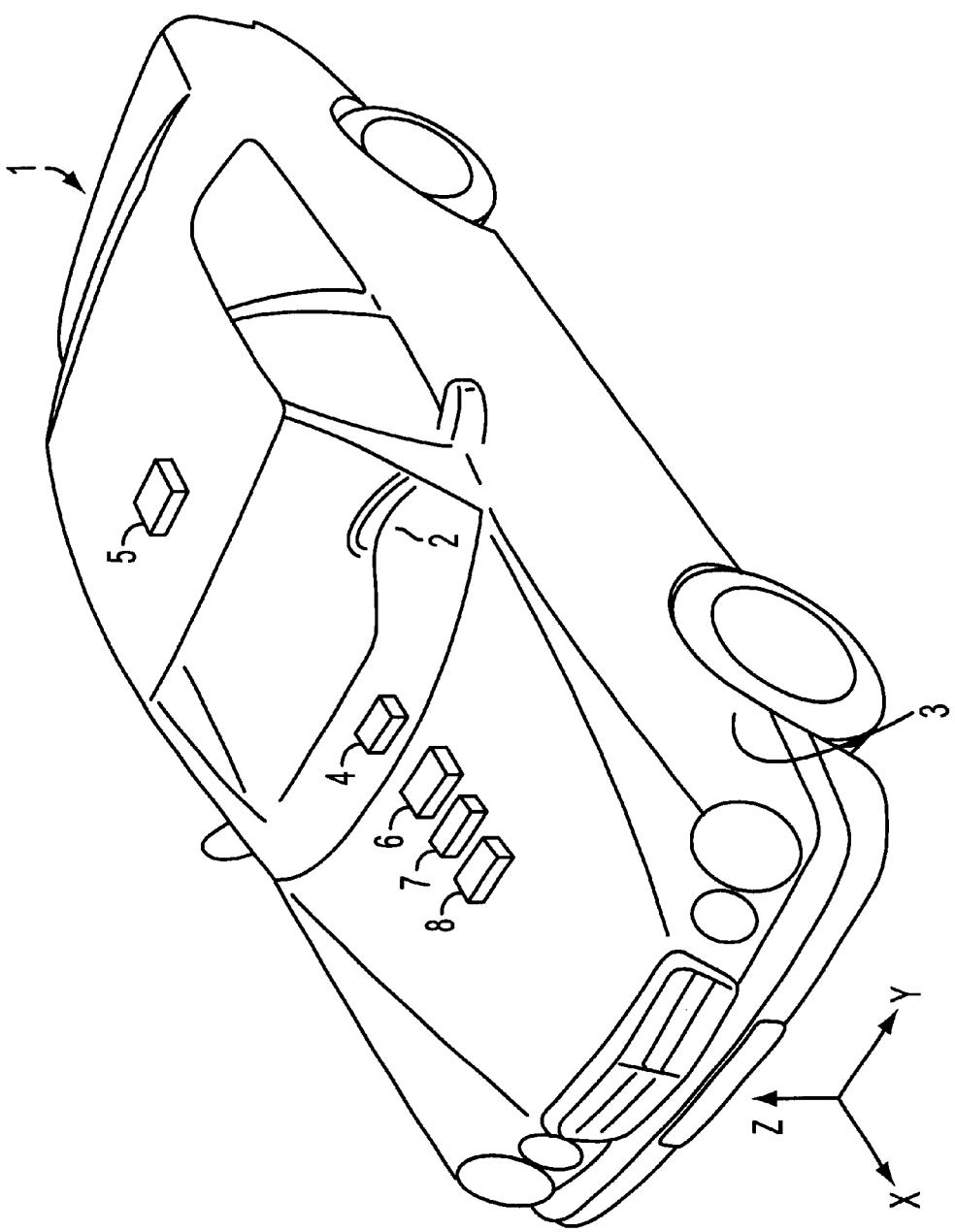
FIG. 1 shows a vehicle having devices for measuring the angle of inclination of the laterally inclined roadway on a bend.

FIG. 1 shows a motor vehicle 1 which contains all the devices for detecting a laterally inclined bend and for measuring its angle of inclination. Located in this motor vehicle is a steering angle sensor 2 which determines the steering angle δ, that is to say the position of the wheels, on the basis of a steering angle. Also located in the motor vehicle 1 is a speed sensor 3 which detects the speed v via the number of wheel revolutions. A lateral acceleration sensor 4 measures the lateral acceleration $a_M$, which is perpendicular to the speed v and parallel to the vehicle plane. The rotation rate sensor 5, likewise fastened on the vehicle 1, measures the rotation rate ($\dot{\Psi}_D$), which is perpendicular to the speed v and perpendicular to the vehicle plane. The data obtained by means of the various sensors are read into an evaluation unit 6 in which it is calculated whether or not a laterally inclined bend is being traversed, and in which the angle of inclination α is likewise calculated. This must be performed in real time, since the instantaneous driving condition is of interest. The information whether or not a laterally inclined bend is being traversed, and the magnitude of the angle of inclination have the effect of raising or lowering a value in a counter 7. If the value of the counter is within a defined range, the information as to whether a laterally inclined bend is present is relayed to a consumer 8, in particular a vehicle dynamics stability controller or a motor vehicle safety system, which then takes the appropriate measures. At the same time, a correction calculation with reference to the exact driving condition is performed using the determined angle of inclination α.

Figure 2:
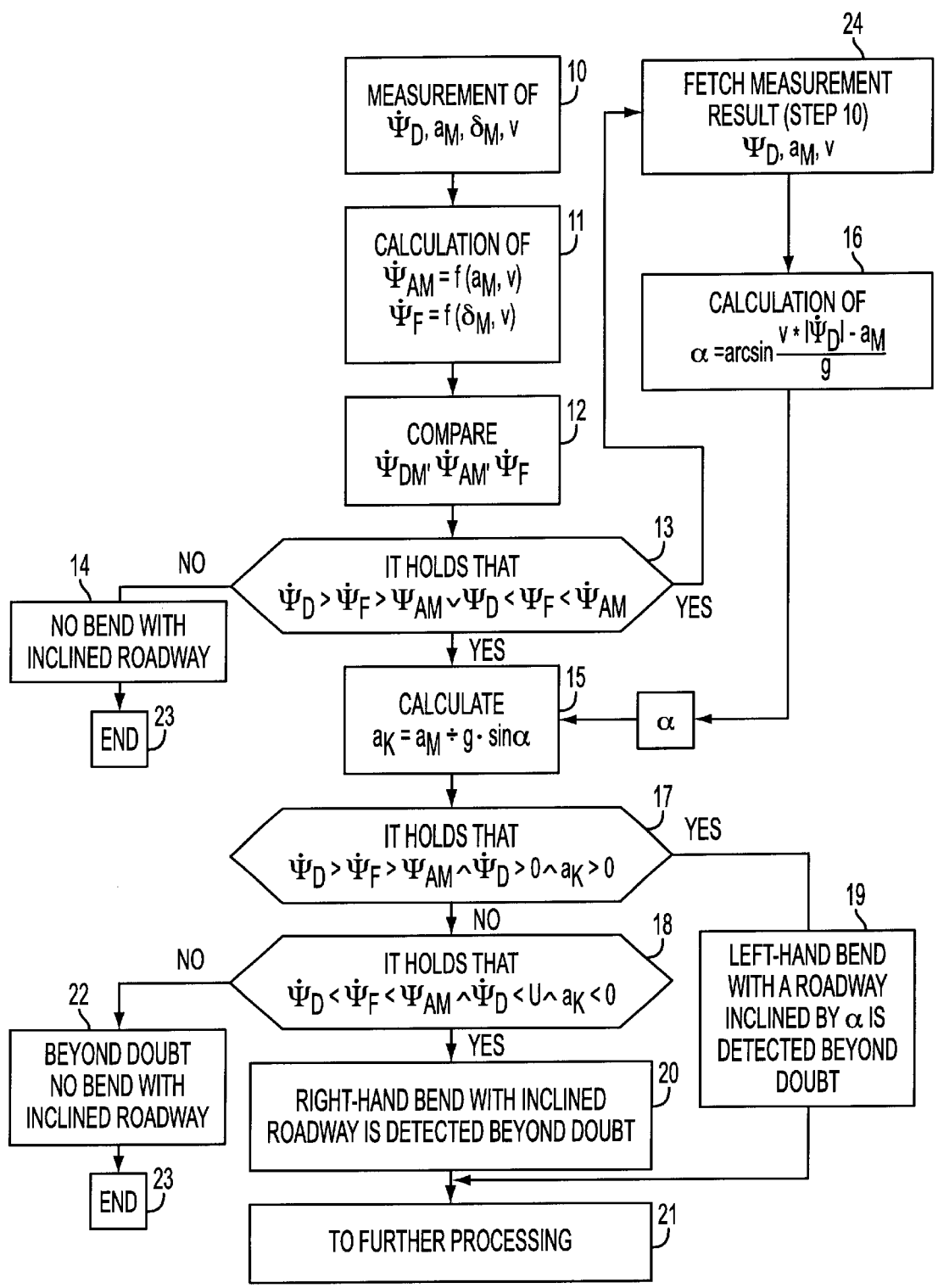
FIG. 2 shows a flowchart for detecting laterally inclined bends and measuring the angle of inclination.

FIG. 2 shows a flowchart for detecting laterally inclined bends and measuring the angle of inclination α. In the first step 10, the rotation rate $\Psi_D$, the lateral acceleration $a_M$, the steering angle $\delta_M$ and the speed v are measured. The further rotation rates:

$$\Psi_{AM} = f(a_M, v) = \frac{a_M}{v} \text{ and } \Psi_F = f(\delta_M, v)$$

are calculated in step 11. A calculation of the magnitudes of the rotation rates obtained in different ways is performed in step 12. If the condition:

$$\dot{\Psi}_D > \dot{\Psi}_F > \dot{\Psi}_{AM} \text{ or } \dot{\Psi}_D < \dot{\Psi}_F < \dot{\Psi}_{AM}$$

is not fulfilled, it is detected beyond doubt in step 14 that no bend with an inclined roadway is present. The determination method is therefore terminated in step 23. If, however, one of the conditions from step 12 is fulfilled, the measurement results $\Psi_D$, $a_M$ and v of step 10 are fetched in step 24. Thereafter, the calculation of α is performed in step 16 by means of:

$$\alpha = \arcsin \frac{v * |\Psi_D| - a_M}{g}.$$

This angle of inclination is then used in step 15 to calculate a lateral acceleration corrected for the gravitational acceleration. Up to this point, it cannot be ensured 100% that the vehicle is actually traversing a bend with an inclined roadway. It is necessary for this reason to perform further value considerations as represented in steps 17 and 18. If, as represented in step 17, the condition: $\dot{\Psi}_D > \dot{\Psi}_F > \dot{\Psi}_{AM}\hat{}$ $\dot{\Psi}_D > 0 \hat{} a_K > 0$ is fulfilled, a left-hand bend with an inclined roadway is detected beyond doubt in step 19. The angle of inclination α determined by means of a measuring device is thereby verified, as represented in step 16. All the data are released and can then be used in step 21 for further processing in other systems, in particular in a vehicle dynamics stability controller or a motor vehicle safety system. If the condition does not hold, the condition: $\dot{\Psi}_D < \dot{\Psi}_F < \dot{\Psi}_{AM}\hat{}$ $\dot{\Psi}_D < 0 \hat{} a_K 0$ is checked in step 18. If this is fulfilled, a right-hand bend with an inclined roadway is detected beyond doubt in step 20. The data are then made available in step 21 for further processing in other systems, in particular in a vehicle dynamics stability controller or a motor vehicle safety system. The calculated angle of inclination α is made available for further calculations. If, however, the condition is not fulfilled in step 18, it is detected beyond doubt in step 22 that no bend with an inclined roadway is present. Further calculations are terminated thereafter in step 23. The angle of inclination a determined in step 16 is not taken into account in correction calculations referring to the driving condition.

Figure 3:
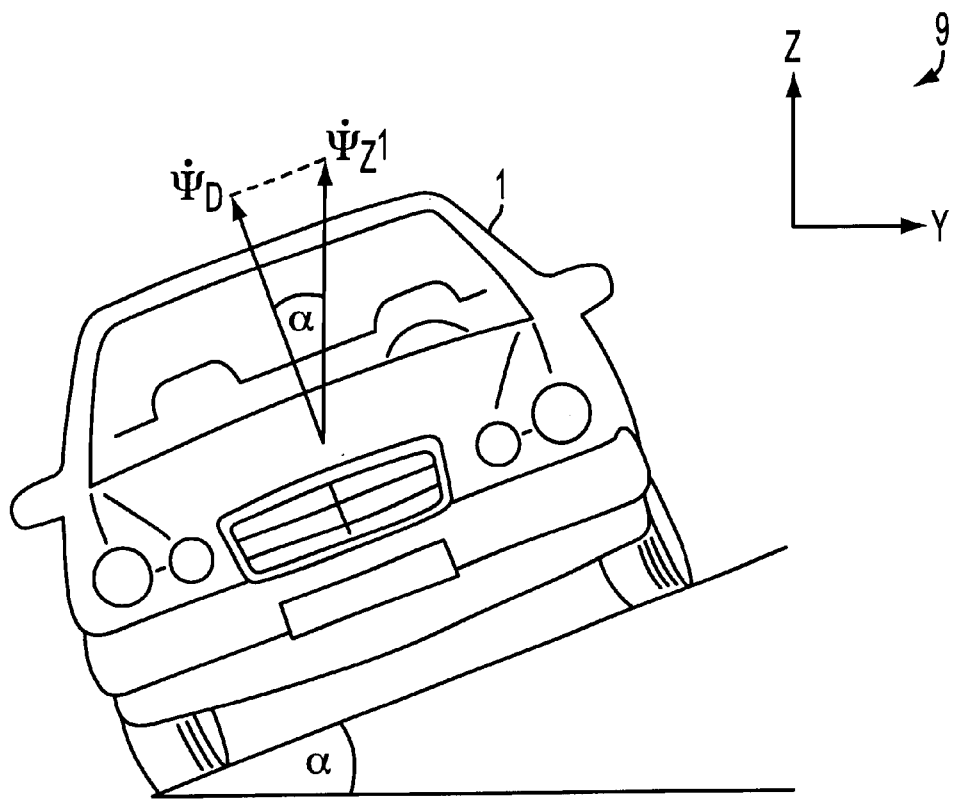
FIG. 3 shows the rotation rate which is detected by the rotation rate sensor in the case of a vehicle on a bend with an inclined roadway.

FIG. 3 shows a vehicle 1 traversing a bend inclined laterally by the angle α. A rotation rate sensor is located in the motor vehicle. The rotation rates are represented in this illustration. The rotation rate measured by the rotation rate sensor is $\dot{\Psi}_D$. This measured rotation rate $\dot{\Psi}_D$ is, however, only a part of the actual rotation rate $\dot{\Psi}_Z$, which is aligned with reference to the z-axis. This axis forms the reference for cornering on a flat, non-inclined roadway. The various main axes in the y-direction and z-direction are represented in the coordinate system 9, which is likewise illustrated. The roadway is inclined on the bend by the angle α with respect to the y-axis. The rotation rate $\dot{\Psi}_D$, which is measured by the rotation rate sensor, is perpendicular to the inclined plane of the roadway.

It holds that:

$$\frac{|\dot{\Psi}_D|}{|\dot{\Psi}_Z|} = \cos \alpha$$

Figure 4:
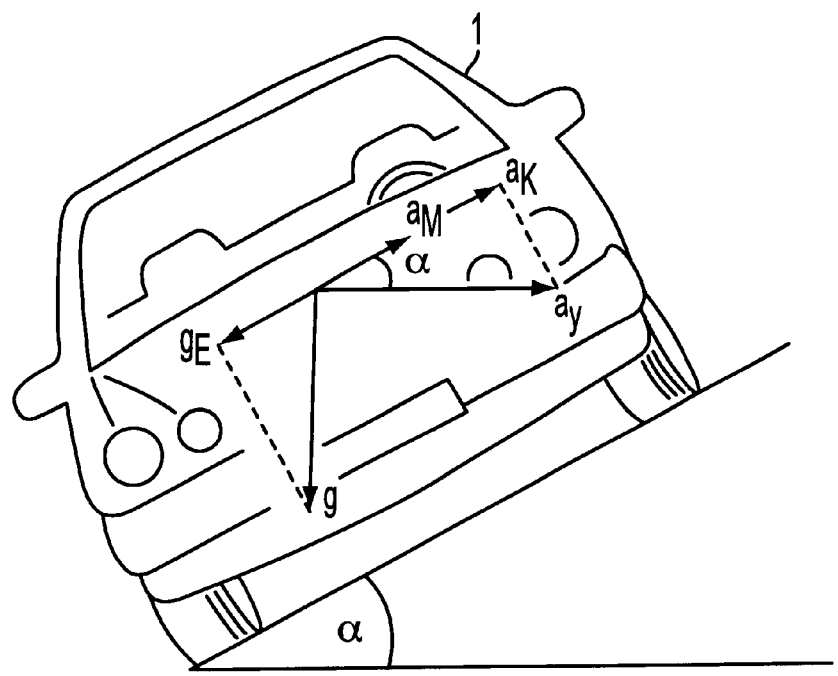
FIG. 4 shows the lateral acceleration which is detected by an acceleration sensor in the case of a vehicle on a bend with an inclined roadway.

FIG. 4 shows the same vehicle 1 traversing a bend inclined laterally by the angle α. The lateral accelerations are represented in this illustration. The roadway is inclined on the bend by the angle α with respect to the horizontal, the y-axis. The various main axes in the y-direction and z-direction are represented in the coordinate system 9, which is likewise illustrated. A lateral acceleration sensor is located in the motor vehicle. The lateral acceleration measured by the lateral acceleration sensor is $a_M$. However, as represented in the illustration, this measured lateral acceleration $a_M$ also contains a component $g_E$, which is caused by the gravitational acceleration g. For this reason, the measured lateral acceleration must be corrected by the factor due to gravity. The following value is yielded for the corrected lateral acceleration $a_K$:

$$a_K = a_M + g * \sin \alpha.$$

This corrected value is also only a fraction of the lateral acceleration $a_Y$ aligned along the y-axis. It then holds for the case represented that:

$$|a_K| = |a_Y| * \cos \alpha$$

It is also known that, if the vehicle does not additionally swerve laterally, the lateral acceleration can be calculated from the rotation rate in the case of cornering:

$$a_Y = v * \dot{\Psi}_Z$$

The basic precondition for this calculation is that the speed v in the driving direction is known. This is measured by a speed sensor.

Together with FIG. 3, this yields the following relationship:

$$\frac{a_K}{\cos\alpha} = \frac{a_M + g * \sin\alpha}{\cos\alpha} = v * \frac{\dot{\Psi}_D}{\cos\alpha} \qquad 5$$

The angle of inclination α can be calculated with the aid of this relationship:

$$\sin\alpha = \frac{v * |\dot{\Psi}| - a_M}{g}$$

and thus: $\alpha = \arcsin\dfrac{v * |\dot{\Psi}_D| - a_M}{g}$

The angle of inclination α of the roadway is thus determined and is available for further calculations.

In order to enhance the safety of such a system further, a further method, as likewise described in FIG. 2, is used to determine in advance whether there is indeed cornering with a laterally inclined roadway, or whether the situation is based on a random, short-term different vehicle state, in particular swerving, skidding, or tilting.

Such a system, which essentially comprises a rotation rate sensor, a lateral acceleration sensor, a speed sensor and an evaluation unit, can additionally contain a counter for the purpose of distinguishing between short-term, random and long-term states. At the start, the counter 7 is at 0, for example. If the measured angle of inclination α overshoots a fixed value, this counter 7 is raised, for example, by the value 1. This measurement is repeated, for example every 7 ms. If the counter 7 then overshoots the value 25, for example, the bend with an inclined roadway is detected and the determined angle of inclination α is made available to a vehicle dynamics stability controller for further calculations. If the conditions for this state continue to be maintained, the counter is incremented up to the maximum value of 40, for example. If, by contrast, the conditions are no longer fulfilled, the counter is decremented. In the case when the value 25 is undershot, it is no longer possible to detect an inclined roadway. The counter is decremented until the value 0, for example, is reached again. It is possible thereby to distinguish a random short-term state from a longer lasting state such as actually occurs when traversing a bend with an inclined roadway.

As already mentioned, bends with an inclined roadway can be traversed, for example, without a steering angle. A vehicle dynamics stabilization program will then detect an error because it measures a lateral acceleration in the y-direction and a rotation rate in the z-direction. However, if the angle of inclination of the roadway is known or measured, the measured values can be used for further calculations. In one method, a first rotation rate $\dot{\Psi}_Q$ is calculated and corrected from the measured lateral acceleration, and a second rotation rate $\dot{\Psi}_F$ is calculated and corrected from the measured steering angle $\delta_M$, as represented in FIG. 2, step 11, and then compared with a third rotation rate $\dot{\Psi}_D$, measured directly by a rotation rate sensor. If the values correspond approximately, a swerving process can be excluded, for example.

In this case, the first rotation rate $\dot{\Psi}_F$, which depends on the vehicle model, is a function of the vehicle speed v and steering angle $\delta_M$. In the case of an inclined roadway on the bend, the value dependent on the vehicle model is affected by an error and must be corrected. In this case, the angle of inclination α is directly proportional to this error. The proportionality factor is determined by series of tests and has a value of approximately 0.27. The result for the first corrected rotation rate $\dot{\Psi}_{FK}$ is:

$$\dot{\Psi}_{FK} = \dot{\Psi}_F + 0.27 * \alpha$$

Figure 5:
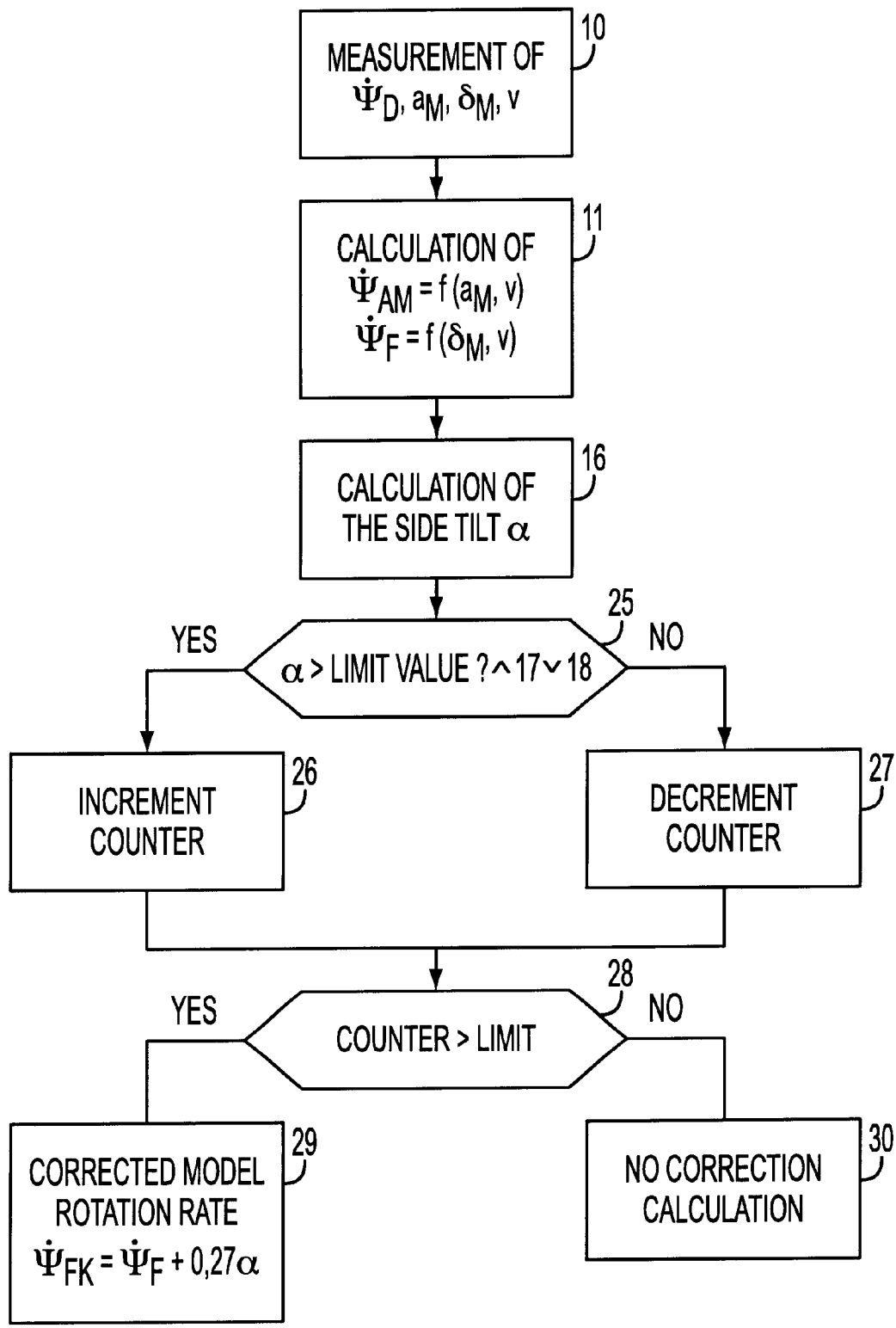
FIG. 5 shows the flowchart for a method with an integrated counter and correction of the rotation rate.

FIG. 5 shows a flowchart for such a method with an integrated counter and correction of the rotation rate $\dot{\psi}_F$. In the first step 10, the rotation rate $\dot{\Psi}_D$, the lateral acceleration $a_M$, the steering angle $\delta_M$ and the speed v are measured. The further rotation rates:

$$\dot{\Psi}_{AM} = f(a_M, v) = \frac{a_M}{v} \quad \text{and} \quad \dot{\Psi}_F = f(\delta_M, v)$$

are calculated in step 11.

The angle of inclination α is then calculated in step 16 using $$\alpha = \arcsin\frac{v * |\dot{\Psi}_D| - a_M}{g}$$

In step 25, the determined angle of inclination is compared with a fixed limit value and it is checked whether one of the following conditions as described in steps 17 and 18, respectively, in FIG. 2 is fulfilled for the different rotation rates. Step 25 states:

$$\dot{\Psi}_D > \dot{\Psi}_F > \dot{\Psi}_{AM} \hat{\ } \dot{\Psi}_D > 0 \hat{\ } a_K > 0 V \qquad 17$$

$$\dot{\Psi}_D < \dot{\Psi}_F < \dot{\Psi}_{AM} \hat{\ } \dot{\Psi}_D < 0 \hat{\ } a_K < 0 \qquad 18$$

If the conditions are fulfilled, the counter is incremented in step 26. If the condition is not fulfilled, the counter is decremented in step 27. After the incrementing or decrementing of the counter, the counter reading is compared in step 28 with a fixed limit value. If the counter reading is smaller than the limit value, no correction calculation is undertaken in step 30, because then no bend with a laterally inclined roadway is being traversed. However, if the counter reading is larger than the fixed minimum, traversing of a bend with a laterally inclined roadway is detected, and a correction calculation is performed in step 29 as regards the rotation rate determined from the steering angle and the speed.

If, despite all the corrections, deviations occur between the measured and calculated values of the rotation rate, lateral acceleration or steering angle, the extraordinary driving situation is detected exactly by a vehicle dynamics stability controller. If the dangerous driving situation is detected, the vehicle dynamics controller can intervene in the further course of the driving, or a motor vehicle safety device can be activated. It is possible with the aid of this method and such a device for the driving condition on a bend with an inclined roadway to be determined precisely and exactly without additional sensors by safety-relevant devices, in particular a vehicle dynamics stability controller. If the precise vehicle state is detected, an exact intervention in the control or the activation of a safety system is always ensured even in unusual and dangerous situations.

What is claimed is:

1. A method for measuring an angle of inclination (α) on laterally inclined bends encountered by a moving vehicle comprising the steps of:

substantially simultaneously measuring lateral acceleration ($a_M$), in a direction which is perpendicular to a direction of vehicle travel and parallel to a vehicle plane, a rate of rotation of the vehicle ($\Psi_D$), as measured by a rotation rate sensor in a direction which is perpendicular to the direction of vehicle travel and perpendicular to the vehicle plane, and vehicle speed (v), and comparing said rate of rotation measured by said rotation rate sensor to a second rotation rate, calculated based upon a steering angle of the vehicle and said vehicle speed, and to a third rotation rate, calculated based upon said lateral acceleration and said vehicle speed, in order to determine if an inclined roadway is present, and if so calculating the angle of inclination ($\alpha$) in real time as a function of lateral acceleration, the rate of rotation of the vehicle and vehicle speed.

2. A device for measuring an angle of inclination ($\alpha$) on laterally inclined bends encountered by a moving vehicle, wherein the device includes:

a lateral acceleration sensor for measuring lateral acceleration ($a_M$) of the vehicle, a rotation rate sensor for measuring a rate of rotation ($\Psi_D$) of the vehicle, a speed sensor for measuring vehicle speed (v), and an evaluation unit operative to determine the angle of inclination ($\alpha$) by means of a predetermined function of substantially simultaneously determined signals received from the lateral acceleration, rotation rate and speed sensors.

3. A method for measuring an angle of inclination ($\alpha$) on laterally inclined bends encountered by a moving vehicle comprising the steps of:

substantially simultaneously measuring lateral acceleration ($a_M$), in a direction which is perpendicular to a direction of vehicle travel and parallel to a vehicle plane, a rate of rotation of the vehicle ($\Psi_D$), in a direction which is perpendicular to the direction of vehicle travel and perpendicular to the vehicle plane, and vehicle speed (v), and calculating the angle of inclination ($\alpha$) in real time as a function of lateral acceleration, the rate of rotation of the vehicle and vehicle speed, wherein presence of roadway inclination is checked in a fixed cycle and a counter increases in value on each occasion when an inclination of the roadway is detected.

4. A method for measuring an angle of inclination ($\alpha$) on laterally inclined bends encountered by a moving vehicle comprising the steps of:

substantially simultaneously measuring lateral acceleration ($a_M$), in a direction which is perpendicular to a direction of vehicle travel and parallel to a vehicle plane, a rate of rotation of the vehicle ($\Psi_D$), in a direction which is perpendicular to the direction of vehicle travel and perpendicular to the vehicle plane, and vehicle speed (v), and calculating the angle of inclination ($\alpha$) in real time as a function of lateral acceleration, the rate of rotation of the vehicle and vehicle speed, wherein presence of roadway inclination is checked in a fixed cycle and a counter is lowered in value on each occasion when an absence of roadway inclination is detected.

5. The method as claimed in claim 3, wherein an indication of roadway inclination is relayed to a vehicle dynamics stability controller, a vehicle safety device or to the driver only when a value of the counter is outside a defined range of values.

6. The method of claim 1 wherein the logic operation comprises $$\alpha = \arcsin \frac{v * |\Psi_D| - a_M}{g}$$

where g is the acceleration of gravity.

7. The device of claim 2 wherein the predetermined function comprises $$\alpha = \arcsin \frac{v * |\Psi_D| - a_M}{g}$$

where g is the acceleration of gravity.

8. The method as claimed in claim 4, wherein an indication of roadway inclination is relayed to a vehicle dynamics stability controller, a vehicle safety device or to the driver only when a value of the counter is outside a defined range of values.

* * * * *